(12) United States Patent
Cheng

(10) Patent No.: US 7,016,743 B1
(45) Date of Patent: Mar. 21, 2006

(54) MODEL-FREE ADAPTIVE CONTROL OF QUALITY VARIABLES

(75) Inventor: George Shu-Xing Cheng, Folsom, CA (US)

(73) Assignee: General Cybernation Group, Inc., Rancho Cordova, CA (US)

( * ) Notice: Subject to any disclaimer, the term of this patent is extended or adjusted under 35 U.S.C. 154(b) by 33 days.

(21) Appl. No.: 10/757,043

(22) Filed: Jan. 14, 2004

Related U.S. Application Data

(62) Division of application No. 09/832,688, filed on Apr. 11, 2001, now Pat. No. 6,684,115.

(60) Provisional application No. 60/196,206, filed on Apr. 11, 2000.

(51) Int. Cl.
*G05B 13/02* (2006.01)

(52) U.S. Cl. .......................... 700/45; 700/53; 700/72; 700/47; 700/28; 700/29; 706/14; 706/15; 706/23; 706/25

(58) Field of Classification Search .................. 700/32, 700/40, 28, 48, 52, 55, 37, 29, 39, 41–45, 700/47, 53, 72; 706/14, 15, 23, 25
See application file for complete search history.

(56) References Cited

U.S. PATENT DOCUMENTS

| | | | | |
|---|---|---|---|---|
| 4,214,300 A | * | 7/1980 | Barlow et al. ................. | 700/32 |
| 5,159,660 A | * | 10/1992 | Lu et al. ........................ | 706/23 |
| 5,272,621 A | * | 12/1993 | Aoki ............................. | 700/45 |
| 5,291,390 A | * | 3/1994 | Satou ........................... | 700/54 |
| 5,353,207 A | * | 10/1994 | Keeler et al. ................. | 700/44 |
| 5,394,322 A | * | 2/1995 | Hansen ........................ | 700/37 |
| 5,486,996 A | * | 1/1996 | Samad et al. ................. | 700/32 |
| 5,566,065 A | * | 10/1996 | Hansen et al. ................ | 700/44 |
| 5,568,378 A | * | 10/1996 | Wojsznis ...................... | 700/44 |
| 5,570,282 A | * | 10/1996 | Hansen et al. ................ | 700/41 |
| 5,838,561 A | * | 11/1998 | Owen ........................... | 700/32 |
| 6,055,524 A | * | 4/2000 | Cheng .......................... | 706/23 |
| 6,260,131 B1 | * | 7/2001 | Kikuta et al. ................ | 711/210 |
| 6,363,289 B1 | * | 3/2002 | Keeler et al. ................. | 700/48 |
| 6,556,980 B1 | * | 4/2003 | Cheng .......................... | 706/23 |

* cited by examiner

*Primary Examiner*—Anthony Knight
*Assistant Examiner*—Thomas Pham

(74) *Attorney, Agent, or Firm*—Stout, Uxa, Buyan & Mullins, LLP

(57) ABSTRACT

A Model-Free Adaptive Quality Variable control system is disclosed for effectively controlling quality variables on-line in closed-loop fashion. It is able to automatically control quality variables under the conditions where there are significant varying time delays and disturbances in the process. Because of its unique capability, the control system is useful for building flexible and adaptive production systems, achieving Six Sigma quality control goals, and fulfilling the on demand manufacturing needs in the new e-commerce environment.

1 Claim, 4 Drawing Sheets

MODEL-FREE ADAPTIVE CONTROL OF QUALITY VARIABLES

This is a divisional of Application No. 09/832,688, filed Apr. 11, 2001, now U.S. Pat. No. 6,684,115, which claims the benefit of Provisional Application No. 60/196,206, filed Apr. 11, 2000.

FIELD OF THE INVENTION

The invention relates to automatic control of industrial processes, equipment, and facilities, and more particularly to a method and apparatus for adaptively controlling product quality related process variables so that "Six Sigma" or "zero-defects" quality goals can be reached.

BACKGROUND OF THE INVENTION

"Six Sigma" has become a new standard for quality control in the industrial world. General Electric alone has saved 5 billion dollars within 3 years since they introduced the program. Sigma (σ) is a Greek alphabet symbol used to represent the standard deviation in statistics. It is a good measurement for the process variability in statistical quality control.

Compared to the previous "Three Sigma" industrial standard that requires a process to produce 99.933% good parts, the "Six Sigma" standard requires the process to produce 99.9999966% good parts. This means that for every one million products, a process with Six Sigma capability will produce almost zero defective parts.

Industry surveys show that a process will typically shift 1.5 Sigma from its center. When this happens, a process with Three Sigma capability will start to produce thousands of bad parts per million while a Six Sigma process will only produce a few bad parts. The following table lists Sigma Numbers and their Defects per Million (DPM) with a 1.5σ shift.

| Sigma (σ) | Defects per Million (DPM) |
| --- | --- |
| 2.0 | 308,300 |
| 3.0 | 67,000 |
| 4.0 | 6,220 |
| 5.0 | 233 |
| 6.0 | 3.4 |

These numbers are astonishing since many industrial processes are probably running at a Two Sigma level since their quality related process variables are under manual control. That means, these processes are producing 15% to 30% waste in their normal operations. If quality variables are under manual control, quality and efficiency will depend very much on the individual operator's skill, experience, and work attitude. The operator has to be able to tweak all the magic knobs, wait, and hope the final products produced are within the specifications.

1. Quality Control History and Status

Quality control has gone through 4 stages that can be summarized in the following table:

| Stage | Period | Description and Tools |
| --- | --- | --- |
| 1 | 1900 to 1940 | Product Inspection = Quality Control |
| 2 | 1940 to 1960 | Statistical Quality Control (SQC) |
| 3 | 1960 to 1986 | Total Quality Control (TQC) |
| 4 | 1987 to Present | (i) Online SQC using computer systems (ii) CSPC = Conventional Process Control + Statistical Process Control |

In the beginning of the 20$^{th}$ century, American engineer T. W. Taylor proposed the idea of product inspection in his scientific management theory. Products are tested against their specifications to pass the good products and reject the bad ones. Although a very large percentage of products today are still made in this way, the technique has major shortcomings including: (1) It does not address the concept of quality; (2) Defective parts are rejected not prevented.

In the early 1940s, the United States required a large volume of high-quality goods for World War II efforts. The government hired a group of scientists to implement a series of quality control standards, thereby forcing the industry to Statistical Quality Control (SQC) methods proposed by Dr. Shewhart and others. SQC is a quality control method based on statistics, which can distinguish the common causes and special causes of quality variations so that quality inspections can be simplified and quality problems can be prevented. [1]

In the 1960s, Japan rebuilt its industry with the help of SQC introduced by Dr. Deming, an America quality control legend. Japan not only applied SQC to its production, but also improved it with a new name, Total Quality Control. TQC embodies a number of new concepts including: (1) QC is everyone's job and (2) Apply QC to all areas possible. [2]

During the 1980s, the huge success of the Japanese quality-based business model forced American industries to learn and apply TQC, and the other quality control and management methods including the well-known Deming's fourteen point management philosophy. [3] In the late 1980s, personal computers made online SQC applications popular and helped industries to improve product quality tremendously, especially in the discrete manufacturing industry. [4]

Unfortunately, however, Statistical Quality Control methods are not sufficient for "true quality control." Today, a large percentage of processes are still running in 2 to 3 Sigma conditions even though online SQC systems are used. This is because although SQC/SPC tools can identify a process's unwanted variations, it cannot tell how to eliminate or reduce them. In practice, there can be multiple reasons for unwanted variations including (1) human errors, (2) lack of process capability, and (3) poor control of process variables.

In the early 1990s, the author of this patent application observed this reality and proposed the idea of CSPC, which states that quality control relies on the combination of Conventional Process Control and Statistical Quality Control. [5][6][7] The idea is very simple. SQC can find the abnormal causes of variations but it is up to the automatic control system to reduce the variations and keep them under control. However, at the time, PID based control systems could not provide adequate control for many quality variables. This led the author to spend years of work seeking more effective control methods and eventually developed the Model-Free Adaptive (MFA) control technology. The first MFA control patent was filed on Oct. 6, 1997 with Ser. No. 08/944,450 and allowed in January 2000.

2. Control Quality Variables Automatically

To conclude, The most effective way to solve quality problems permanently is to control the quality variables through an automatic process control system. Therefore, it is desirable to develop an automatic control system that can control quality variables automatically and force the quality variables to track their setpoints while the process has to go through various production changeovers in batch, recipe, and product size, etc.

The Model-Free Adaptive (MFA) control methodology described in U.S. patent Ser. No. 08/944,450, and patent application Ser. Nos. 09/143,165 and 09/174,156 are able to deal with various complex systems and effectively control quality related process variables. However, we still face the following difficulties when controlling quality variables:

a) The process has significant time-delays and the delay time varies due to production speed changes;

b) The process also has large disturbances due to "wild" product inflow changes, load changes, etc.; and c) The quality variables cannot be measured online and the measurement for the quality is based on off-line lab test data or other off-line measurement methods; and d) There is a big change in the system dynamics so that a regular MFA controller is unable to provide prompt and adequate control action to meet the control performance criteria.

To describe the application in more detail, a zinc galvanizing process is studied in the following. A continuous galvanizing process applies a thin surface coating of zinc to steel products and is a critical operating unit in steel sheet production. Steel sheets are popular products used for cans, refrigerators, and automobiles, etc. The thickness of the zinc layer is an important quality variable. Too thin a layer can cause corrosion and damage the product, and too thick a layer will waste too much zinc, a precious metal.

From a control point of view, a continuous galvanizing process has the following behavior: (1) nonlinear, (2) large and varying time delays, (3) multivariable, and (4) frequent production changeovers. According to an industry survey, the thickness of most continuous galvanizing processes is still under manual control resulting in lower efficiency, wasted manpower and materials, and inconsistent product quality.

In this patent application, we introduce a Model-Free Adaptive control system to automatically control the quality variables and quality related process variables.

SUMMARY OF THE INVENTION

The present invention overcomes the above-identified limitations of the prior art by using a specially designed Model-Free Adaptive control system, which includes an Anti-delay MFA controller, a set of Feedforward MFA controllers, and a signal emulator. The MFA quality variable control system is able to automatically control quality variables under the conditions where there are significant varying time delays and disturbances in the process. Because of its unique capability, the control system is useful for building flexible and adaptive production systems, achieving Six Sigma quality control goals, and fulfilling the on demand manufacturing needs in the new e-commerce environment.

DESCRIPTION OF THE PREFERRED EMBODIMENTS

A. Single-Variable Model-Free Adaptive Quality Control

Figure 1:
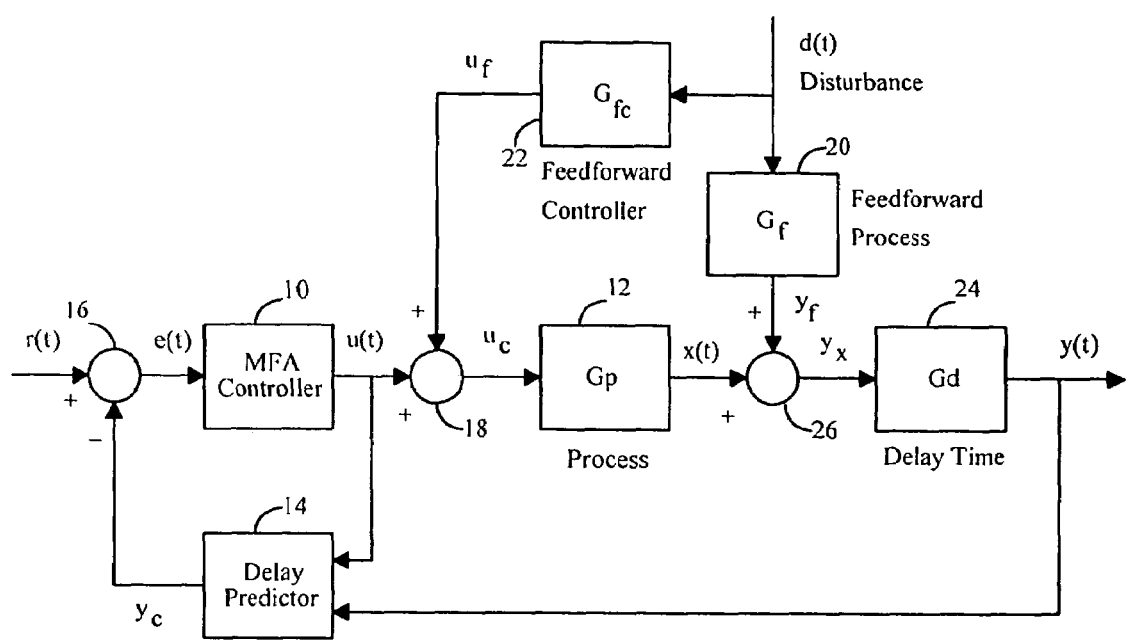
FIG. 1 is a block diagram illustrating a single-variable model-free adaptive quality variable control system according to this invention.

As illustrated in FIG. 1, a single variable Model-Free Adaptive quality variable control system is introduced. The system includes a standard MFA controller 10, a single-input-single-output (SISO) process 12, a delay predictor 14, signal adders 16 and 18. In addition, the system consists of a feedforward process 20, a feedforward MFA controller 22, a delay process 24, and a signal adder 26. The signals shown in FIG. 1 are as follows:

---

$r(t)$-Setpoint.
$y(t)$-Process Variable or the Measured Variable.
$x(t)$-Output of Process $G_p$.
$y_f(t)$-Output of the Feedforward Process $G_f$.
$y_x(t)$-Input to the Delay Process $G_d$, $y_x(t) = x(t) + y_f(t)$.
$y_c(t)$-Output of the Delay Predictor.
$u(t)$-Feedback MFA controller output.
$u_1(t)$-Feedforward MFA controller output.
$u_c(t)$-Combined control output, $u_c(t) = u(t) + u_1(t)$.
$d(t)$-Disturbance.
$e(t)$-Error between the Setpoint and Predictor Output, $e(t) = r(t) - y_c(t)$.

---

The functions of elements 10, 12, 14, and 16 have been described in the patent application Ser. No. 08/944,450 and Ser. No. 09/143,165, which are herein incorporated by reference.

As disclosed in more detail in the above patent applications, the MFA controller 10 consists of a learning neural network with a multi-node input layer to which time-delayed functions of an error signal $e(t)$ are applied, a multi-neuron hidden layer which sums the outputs of the input layer nodes individually weighted by weighting factors $w_{ij}(n)$, and a single-neuron output layer which sums functions of the outputs of the hidden layer neurons individually weighted by weighting factors $h_j(n)$. The output $u(t)$ of the neural network is a function of the output of the output layer neuron.

The special delay predictor 14 is described in the Anti-delay MFA controller section of in the patent application Ser. Nos. 08/944,450 and 09/143,165. The predictor is designed to produce a dynamic signal $y_c(t)$ to replace the measured variable $y(t)$ as the feedback signal. Then, the input to controller 10 is calculated through adder 16 as $$e(t)=r(t)-y_c(t) \qquad (1)$$

The idea of this design is to produce an $e(t)$ signal for the controller and let it "feel" its control effect without much delay so that it will keep producing proper control signals.

Since the MFA controller in the system has powerful adaptive capability, the delay predictor is designed in a simple first-order-lag-plus-delay (FOLPD) form represented by the following Laplace transfer function:

$$Y_c(S) = Y(S) + Y_p(S) \quad (2)$$

$$= Y(S) + \frac{K(1-e^{-\tau S})}{TS+1}U(S),$$

where $Y(S)$, $Y_p(S)$, $U(S)$, and $Y_c(S)$ are the Laplace transform of signals $y(t)$, $y_p(t)$, $u(t)$ and $y_c(t)$, respectively; $y(t)$ is the process variable; $y_p(t)$ is the predictive signal; and $y_c(t)$ is the output of the predictor; $K$, $T$, $\tau$ are the parameters of the predictor.

The process static gain can be set as $$K = \frac{1}{K_c}, \quad (3)$$

where $K_c$ is the MFA controller gain, which is entered by the user.

The predictor time constant can be selected as $$T=T_c \quad (4)$$

where $T_c$ is the estimated process time constant.

The process delay time $\tau$ is set based on a rough estimation of process delay time provided by the user.

1. Feedback MFA Controller Parameters

Although the above referenced Anti-Delay MFA controller is simple and works for many processes with large time delays, it lacks the flexibility of adjusting control performance since the controller gain $K_c$ and Time Constant $T_c$ are also tied to the Delay Predictor. For instance, if we increase the Controller Gain $K_c$ for more active control action, since the estimated process static gain $K$ is calculated based on $K_c$ according to Equation (3), the change will affect the output of the Delay Predictor $y_c(t)$. Since $e(t)$ is calculated with $y_c(t)$ by Equation (1), it will also change and then affect the controller output. This circular relationship forbids us to freely adjust MFA controller parameters.

One way to achieve flexibility is to allow free entry for controller parameters $K_c$ and $T_c$, as well as estimated process constants $K$, $T$, and $\tau$. That means, the user needs to enter 5 parameters when configuring an Anti-Delay MFA controller.

2. Performance Index

In order to simplify the controller configuration procedure, we can design a Performance Index as follows:

$$0.01 \leq Ip \leq 100, \quad (5)$$

$$K_c = \frac{Ip}{K}, \quad (6)$$

$$T_c = \frac{T}{Ip}, \quad (7)$$

where $Ip$ is a real number as the Performance Index with default value of 1.0, $K_c$ is the Controller Gain and $T_c$ is the Time Constant, $K$ and $T$ are estimated process parameters entered by the user. In this way, the user can simply enter $K$, $T$, $\tau$ to estimate the process dynamics and use $Ip$ to adjust the control performance. Notice that the estimated delay time $\tau$ is not related to the Performance Index.

3. Feedforward MFA Controller Parameters

The patent application Ser. No. 09/143,165 disclosed two Feedforward MFA controller designs based on a first-order dynamic block. In order to compensate for the large time delays included in the feedforward process $G_f$, we introduce a new design for the Feedforward MFA controller in the following Laplace transfer function:

$$G_{fc}(S) = \frac{K_{fc}e^{-\tau_{fc}S}}{T_{fc}S+1}, \quad (8)$$

where its parameters are defined in the following:

$K_{fc}$—Feedforward Controller Gain, $T_{fc}$—Feedforward Time Constant.

$T_{fc}$—Feedforward Delay Time.

The configuration procedures for these parameters are described in the following section.

4. Feedforward MFA Control for Process with Large Time Delays

A process with large time delays can also have significant yet measurable disturbances. In this case, we can add a feedforward MFA controller to reduce the effect of the disturbance to the loop before the feedback loop takes corrective action, thereby improving the control system performance quite economically.

However, applying a feedforward controller to a process with large time delays can be quite complicated. As shown in FIG. 1, the potential time delays can be in the processes $G_p$, $G_f$, and a separate process $G_d$ with pure delay time $\tau d$.

Typically, for a quality variable that cannot be measured online, delay time $\tau d$ is the time in between each manual sample or lab test of the quality measurement. In practical applications, this delay tine can be as big as 4 to 8 hours.

In order to describe the process with time delays in more detail, let us define the following symbols for the different delay times:

$\tau_p$—Delay Time in Process $G_p$ $\tau_f$—Delay Time in Feedforward $G_f$ $\Sigma_d$—Delay Time in Delay-time Process $G_d$ If the process has a large delay time, the MFA control system should be configured according to the following cases:

Case 1. $\tau_d$ is much bigger than $\tau_p$ and $\tau_f$.

Solution 1.

1. For the Anti-delay MFA controller, configure $K$, $T$, and $Ip$ as described in the previous section. Estimate $\tau_d$ and let $$\tau=\tau_d. \quad (9)$$

2. For the Feedforward MFA controller, ignore $\tau_p$ and $\tau_f$ by letting $$\tau_{fc}=0. \quad (10)$$

Configure feed forward MFA controller gain based on the following Equation:

$$K_{fc} = -\frac{K_f}{K_p}, \quad (11)$$

where $K_{fc}$ is the MFA Feedforward controller gain, $K_f$ is the estimated static gain of process $G_f$, and $K_p$ is the estimated static gain of process $G_p$. Then estimate $T_f$ and let $$T_{fc} = T_f \quad (12)$$

where $T_f$ is the feedforward time constant of feedforward process $G_f$.

Case 2. $\tau_d$ is approximately zero, $\tau_p$ is bigger than $\tau_f$.

Solution 2: Since $\tau_d$ is 0, the disturbance signal from d(t) will show up quickly at y(t). Then the feedback controller will get this signal with almost no delay. Therefore, there is no need to include feedforward control in this case. The feedback Anti-delay controller can be used as usual.

Case 3. $\tau_d$ is approximately zero, $\tau_f$ is bigger than or equal to $\tau_p$.

Solution 3. The feedforward MFA controller is required to compensate for the large delay time in $G_f$ based on the following formula:

$$\tau_{fc} = \tau_f - \tau_p, \quad (13)$$

where $\tau_{fc}$ is the delay time of the feedforward MFA controller. That is, the feedforward control action of $u_f$ needs to be delayed by $\tau_{fc}$ in order to cancel out the feedforward disturbance of $y_f$ to the system.

B. MIMO Model-Free Adaptive Quality Variable Control

Figure 2:
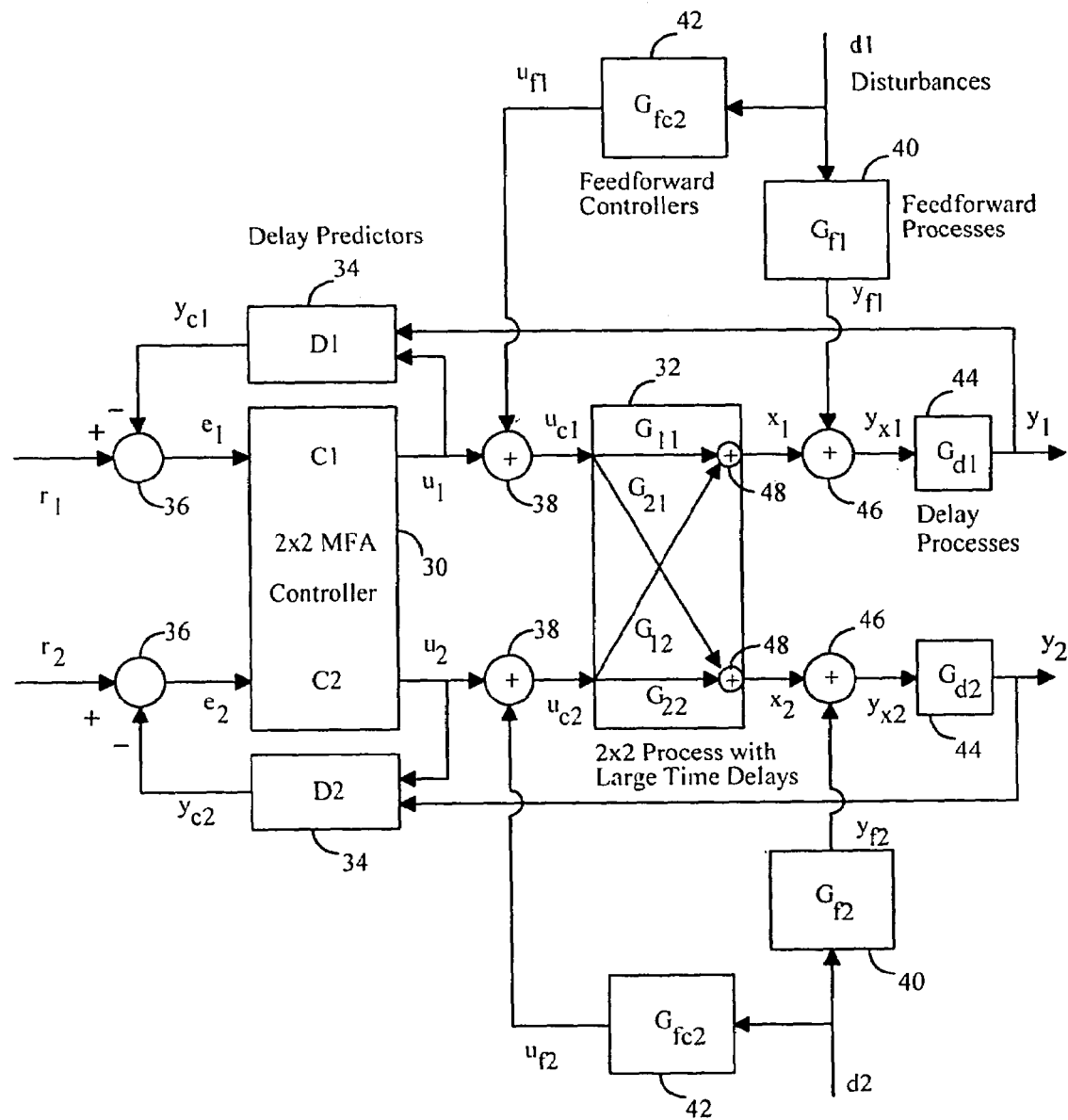
FIG. 2 is a block diagram illustrating a multivariable model-free adaptive quality variable control system according to this invention.

Without losing generality, FIG. 2 illustrates a multi-input-multi-output (MIMO) Model-Free Adaptive Quality Variable Control System, which includes a 2-input-2-output MFA Controller 30, a 2-input-2-output (2×2) process 32, two Delay Predictors 34, and two pair of signal adders 36 and 38. Similar to the single variable case, the system also consists of two Feedforward processes 40, two Feedforward MFA controllers 42, two Delay processes 44, and one pair of signal adders 46.

The 2×2 process consists of two main processes $G_{11}$ and $G_{22}$, and two sub- processes $G_{21}$ and $G_{12}$. The measured Process Variables $y_1$ and $y_2$ are used as the feedback signals of the main control loops. They are fed into the Delay Predictors 34 along with the controller outputs $u_1$ and $u_2$ to generate the synthesized signals $y_{c1}(t)$ and $y_{c2}(t)$. These two signals are compared with the setpoints $r_1$ and $r_2$ at adders 36 to produce errors $e_1$ and $e_2$, which are the inputs to the 2×2 MFA Controller.

The output of each sub-process is cross-added by adders 48 to produce process outputs $x_1$ and $x_2$. Notice that in real applications the outputs from the sub-processes are not measurable and only their combined signals $x_1$ and $x_2$ can be measured. Thus, by the nature of the 2×2 process, the inputs $u_{c1}$ and $u_{c2}$ to the process are interconnected with its outputs $x_1$ and $x_2$. One input change wilt cause both outputs to change.

The signals shown in FIG. 2 are as follows:

$r_1(t)$, $r_2(t)$—Setpoint of controllers $C_1$ and $C_2$, respectively.

$y_1(t)$, $y_2(t)$—Measured Process Variables of the 2×2 process.

$d_1(t)$, $d_2(t)$—Disturbance to $y_1$ and $y_2$, respectively.

$x_1(t)$ and $x_2(t)$—Output of the 2×2 Process.

$y_{f1}(t)$ and $y_{12}(t)$—Output of the Feedforward Processes $G_{11}$ and $G_{12}$.

$y_{x1}(t)$ and $y_{x2}(t)$—Sum of $x_1(t)$ and $y_{f1}(t)$, and sum of $x_2(t)$ and $y_{12}(t)$, respectively.

$y_{c1}(t)$ and $y_{c2}(t)$—Output of the Delay Predictors $D_1$ and $D_2$.

$u_1(t)$ and $u_2(t)$—Output of the feedback MFA controllers $C_1$ and $C_2$.

$u_{f1}(t)$ and $u_{12}(t)$—Output of the feedforward MFA controllers $G_{fc1}$ and $G_{fc2}$.

$u_{c1}(t)$ and $u_{c2}(t)$—Combined control outputs.

$e_1(t)$ and $e_2(t)$—Error between the Setpoint and Predictor Output for $C_1$ and $C_2$.

The functions of elements 30, 32, 34, and 36 have been described in the patent application Ser. No. 08/944,450 and Ser. No. 09/143,165. However, a multivariable control system for controlling a multivariable process with large time delays and disturbances is much more complex than its single variable case.

The first important thing in configuring such a control system is the variable pairing between process inputs and outputs. Process inputs are the so-called manipulated variables since they are manipulated by the controller outputs. Process outputs are the controlled Process Variables. The variable pairing rules are described as follows:

1. Each process in the main loops has to be controllable, open-loop stable, and either reverse or direct acting.
2. A process with a large static gain should be included in the main loop as the main process; and a process with a small static gain should be treated as the sub-process.
3. A faster process should be paired as the main process; and a slower process and processes with time delays should be treated as the sub-processes.

A MIMO Anti-Delay MFA controller is required if at least one main process in a multivariable system has significant time delays. According to the pairing rules, we usually do not want to include a process with large time delays in a main loop. However, since the Pairing Rules 2 and 3 may be in conflict, a tradeoff may be the only option.

For the MIMO MFA Quality Variable control system, the design aspects of the feedback MFA controllers and feedforward MFA controllers are the same as described in the single variable case. The key is to focus on each individual main loop after the pairing and interaction problems are handled.

C. SISO MFA Quality Variable Control System with a Signal Emulator

In real applications, we often face the reality that the quality variables are not measured online and the measurement for the quality is based on off-line lab test data or other off-line measurement methods. It is a major challenge to control the quality variables in a closed-loop fashion.

Figure 3:
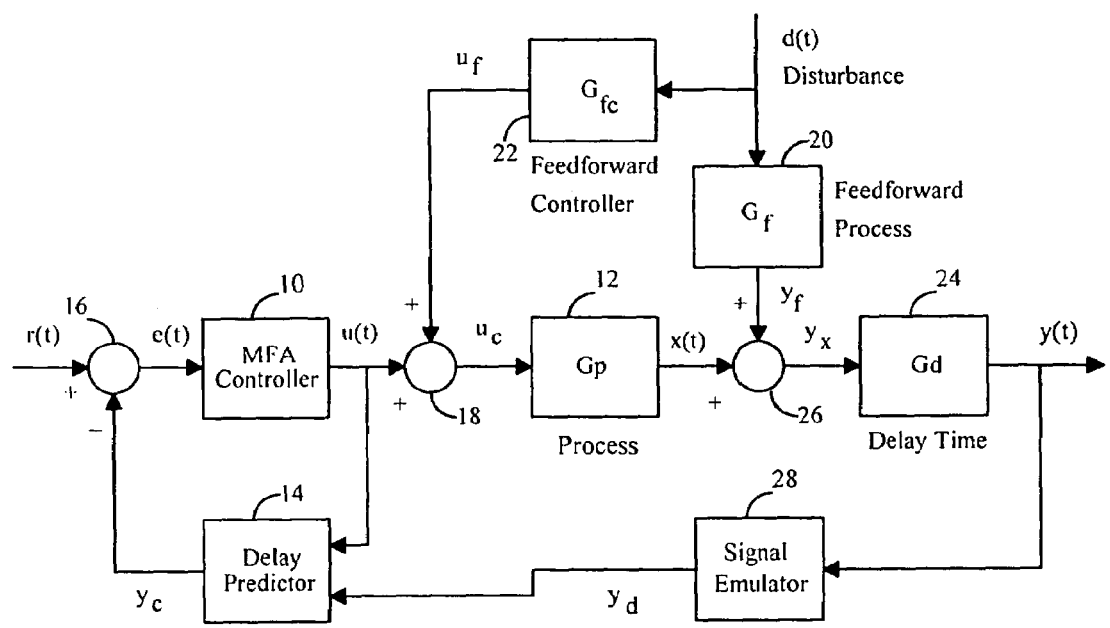
FIG. 3 is a block diagram illustrating a single-variable model-free adaptive quality variable control system with a signal emulator according to this invention.

FIG. 3 illustrates an MFA Quality Variable Control System with a Signal Emulator. It consists of elements 10 to 26 as described in Section A, and a Signal Emulator 28, which is designed to provide a smooth and adequate measurement signal of the Process Variable (PV) to the controller under the following conditions: (1) When no online measurement for the Process Variable is available; and (2) The measurement signal is noisy.

When a Signal Emulator is used, the Delay Predictor's input signal becomes $y_d(t)$ and its Laplace transfer function is revised into the following form:

$$Y_c(S) = Y_d(S) + Y_p(S) \quad (14)$$

$$= Y_d(S) + \frac{K(1 - e^{-\tau S})}{TS + 1}U(S),$$

where $Y_d(S)$, $Y_p(S)$, $U(S)$, and $Y_c(S)$ are the Laplace transform of signals $y_d(t)$, $y_p(t)$, $u(t)$ and $y_c(t)$, respectively; $y_d(t)$ is the output of the Signal Emulator, $y_p(t)$ is the predictive signal; $y_c(t)$ is the output of the predictor; K, T, τ are the parameters of the predictor. Notice that here the process variable y(t) is replaced by the output of the Signal Emulator $y_d(t)$ assuming the signal y(t) is filtered or emulated by the Signal Emulator 28.

There are different ways to build a Signal Emulator depending on the application and required engineering effort. Some of the techniques are described including the following.

1. Soft-Sensor

Developing a Soft-Sensor is probably the most sophisticated approach for building the Signal Emulator. A Soft-Sensor is typically a computer program based process model that can produce an estimated signal to approximate the Process Variable which cannot be measured online. There is no general-purpose Soft-Sensor available because each Process Variable can be so different. There are different techniques for building Soft-Sensors including the first principle model, identification based model, and rule based model, etc.

2. Noise Filter

If the online or offline measurement data include noise, the Signal Emulator can be designed as a noise filter. Depending on the characteristics of the noise, high-pass, low-pass, and other types of filters can be easily implemented.

3. Data Qualifier

IF the measurement is based on off-line tab test data and needs to be entered manually, it is wise to add a mechanism to qualify the data entered in order to reduce or eliminate human error. This is because any bad data entered into the control system can cause major disturbances and must be screened out. A data qualifier can be as simple as a set of high and low limits that can reject any data falling outside the limits. One can also design a more sophisticated algorithm or rule-based mechanism to screen the data based on data patterns, historical data, and a set of rules.

4. Setting of Sample Interval

The simplest way to control a process with only offline measurement data is to run the controllers slowly based on each fresh sampled data. That is, there is no need to calculate the control outputs during the time period when there is no update feedback signal. In this case, the control systems disclosed in Sections A and B are still valid. The only important matter is to select a proper Sample Interval, which is part of the control algorithm in its digital form.

D. MIMO MFA Quality Variable Control System with a Signal Emulators

Figure 4:
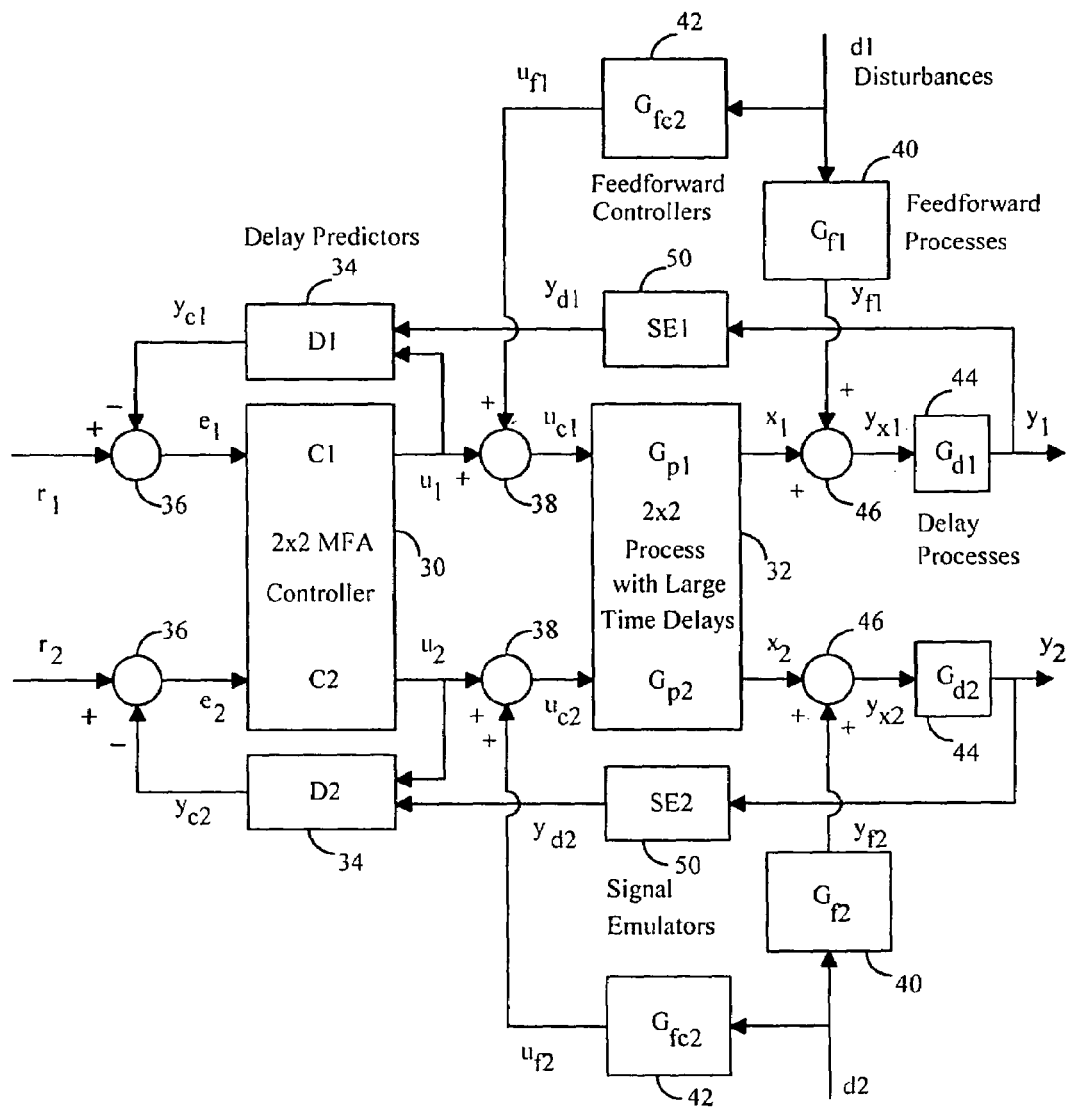
FIG. 4 is a block diagram illustrating a multivariable model-free adaptive quality variable control system with a set of signal emulators according to this invention.

FIG. 4 illustrates an MIMO MFA Quality Variable Control System with Signal Emulators. It consists of elements 30 to 46 as described in Section B, and Signal Emulators 50. The 2×2 process is represented in a more generic format with main processes Gp1 and Gp2. The design aspects of the Signal Emulators are the same as described for the single variable case.

I claim:

1. A method of adjusting the performance of a model-free adaptive controller having a delay predictor, comprising the steps of:
    a) establishing a selectable performance index Ip ranging from substantially 0.01 to substantially 100;
    b) setting the controller gain as Kc=Ip/K, where Kc is the controller gain, K is the estimated process static gain, and Ip is the selected performance index; and
    c) setting the controller time constant as Tc=T/Ip, where Tc is the controller time constant, T is the estimated time constant of said delay predictor, and Ip is the selected performance index.

* * * * *